United States Patent [19]

Brown et al.

[11] 4,427,555

[45] Jan. 24, 1984

[54] FILTER SYSTEM

[75] Inventors: Robert L. Brown, Tewksbury; Wesley M. Tufts, Holliston, both of Mass.

[73] Assignee: Control Fluidics, Inc., New York, N.Y.

[21] Appl. No.: 452,950

[22] Filed: Dec. 27, 1982

[51] Int. Cl.³ .............................................. C02C 1/18
[52] U.S. Cl. ................................. 210/805; 210/807; 210/136; 210/196; 210/265
[58] Field of Search ............... 210/805, 807, 136, 173, 210/174, 196, 265, 268, 275

[56] References Cited

U.S. PATENT DOCUMENTS

| | | | |
|---|---|---|---|
| 3,655,048 | 4/1972 | Pergola | 210/196 |
| 3,956,128 | 5/1976 | Turner | 210/196 |
| 4,033,872 | 7/1977 | Mori et al. | 210/196 |
| 4,277,336 | 7/1981 | Henschel, Jr. | 210/196 |

*Primary Examiner*—John Adee
*Attorney, Agent, or Firm*—Robert T. Gammons

[57] ABSTRACT

A filter system wherein there is a first chamber containing fluid at a predetermined level, a shroud positioned in the first chamber immersed in the fluid, said shroud defining a downwardly-open second chamber, a quantity of discrete, buoyant bodies supported in the shroud by flotation, said discrete, buoyant bodies defining a filter media, a conduit connected to the top of the shroud for delivering fluid to the shroud at a pressure to displace the discrete, buoyant bodies downwardly therein as the fluid is forced downwardly into the shroud and into the lower part of the first chamber below the shroud, a second chamber surrounding the first chamber, a conduit connecting the top of the shroud with the second chamber, a conductor connected to the bottom of the second chamber providing an outlet from the bottom and valves in the several conduits operable on the one hand to admit fluid into the shroud and to permit fluid to be withdrawn from the third chamber while blocking flow of fluid from the first chamber to the second chamber and on the other hand to terminate flow of fluid into the shroud and flow from the second chamber while permitting flow from the shroud into the second chamber.

24 Claims, 9 Drawing Figures

FILTER SYSTEM

BACKGROUND OF INVENTION

This invention pertains to a system for filtering fluids contaminated with raw sewage from household toilets, the treatment of the filtered effluent and the eventual return of the fluid to again be used in the toilet. Specifically, the system is designed for recycling the water in a toilet for the express purpose of reducing by over 99% the consumption of water normally used to flush the toilet. It is to be understood, however, that the system can be used in any situation wherein it is desirable to remove extraneous matter in the form of solids whether noxious or not from a fluid either to enable recovery of the fluid or recovery of the extraneous matter.

The known systems for filtering have a number of disadvantages when the task involves the filtering of high concentrations of solids. One of the disadvantages is the rapid clogging of the surface of the depth filtration media, resulting in a rapid pressure drop across the filter. As the surface cake becomes more and more impervious to the passage of solids, a large portion of the filter media below the surface is not used.

Another disadvantage is that when a filter media is selected such that the filterable particles are allowed to penetrate the filter media to greater depth as in the true depth filtration, the filtered particles of smaller size commonly pass completely through the filter bed, resulting in poor filter performance.

The main object of this invention, therefore, is to overcome these primary disadvantages. Because household toilet wastes, after being broken down by a hydraulic attrition unit, are comprised of a wide range of particle sizes and vary in consistency, a further object of this invention is to provide a non-clogging filter system that is efficient over a wide range of conditions and particle sizes, yet which will be compact enough to install in a typical single-family dwelling using only as much space as a common 40 to 50 gallon hot water tank. A further object of this invention is to provide a depth filtration system comprised of a floating bed of filter particles of relatively large media elements and a flow path intentionally developed to uniformly distribute the incoming waste water throughout the media elements while dislodging and causing to settle the contaminants collected by the previous filtration cycle. Still a further object is to provide a highly efficient and reliable system capable of being manufactured at a cost that a house owner could rapidly recover when compared to the increasing costs of water consumption, sewers and septic tank maintenance.

Other characteristics of the invention will become evident from the description with reference to the accompanying drawings.

SUMMARY OF THE INVENTION

As herein illustrated, the filter system embodies a filter module which comprises means defining a first chamber containing fluid up to a predetermined level, a shroud positioned in the first chamber immersed in the fluid, said shroud defining a downwardly-open second chamber, a quantity of discrete, buoyant bodies supported in the shroud by flotation, said discrete, buoyant bodies defining a filter medium, a conductor connected to the top of the shroud for delivering fluid to be filtered to the shroud at a pressure to disperse the discrete bodies downwardly therein as the fluid is forced downwardly into the shroud and into the lower part of the first chamber below the shroud, means surrounding the first chamber and defining in conjunction therewith an annular chamber, a conductor connecting the top of the shroud with the third chamber, a conductor connected to the bottom of the third chamber providing an outlet from the bottom and valves in the several conductors operable on the one hand to admit fluid into the shroud and to permit fluid to be withdrawn from the third chamber while blocking flow of fluid from the first chamber to the third chamber and on the other hand to terminate flow of fluid into the shroud and flow from the third chamber while permitting flow from the shroud into the third chamber. The first chamber may be of generally circular cross section, the shroud of conical configuration and the second chamber of generally circular cross section. The second chamber is open at its lower end and provides for confining a body of buoyant, particulate bodies by flotation therein in the form of densely-packed filter media. Desirably, the buoyant bodies are of spherical configuration; however, they may be of irregular configuration and, when densely-packed, provide, in the case of the spherical bodies, passages in the order of 15% the nominal diameter of the spherical bodies and when in the form of irregular bodies, passages in the order of 5% the nominal diameter of the irregular bodies. The filter module is provided with an intake conductor through which fluid to be filtered is delivered to the module and a discharge conductor through which the filtrate can be returned to the source from which it came for reuse. Specifically, in a toilet system, the intake conductor is connected to the discharge port of the toilet bowl and the discharge conductor is connected to the flush tank.

The invention will now be described with reference to the accompanying drawings, wherein:

FIG. 1 diagrammatically illustrates a closed system wherein fluid containing solids is delivered to a filter for filtering and then returned from the filter for use;

FIG. 2 diagrammatically illustrates a closed system wherein effluent is flushed from a toilet bowl into a filter for filtering and returning to the flush tank of the toilet for reuse;

Figure 1:
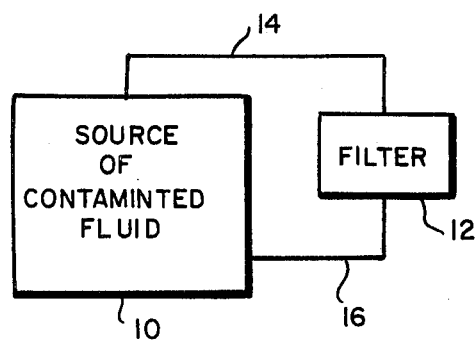

The method of filtering according to this invention is carried out in two stages: a first stage wherein the incoming waste water is directed through a conductor down through a conical chamber containing a bed of buoyant filter media bodies to disperse the same; and a second stage wherein the incoming waste water is cut off and filtering takes place. The effectiveness of the system is predicated upon intermittent operation. The incoming waste water causes the filter media to be dispersed in the first stage of operation downwardly and uniformly recirculated in the conical chamber, thus freeing high concentrations of entrapped particulate matter previously deposited so that it gravitates out of the system and when the incoming water is shut off, the filter media returns to form a filter bed in the second stage of operation which entraps the newly-introduced particulate particles throughout the depth of the reformed media. This reforming of the bed of particulate bodies is essential for high filter performance as it continuously provides a plurality of new locations to entrap particulate matter. The conical filter media enclosure is positioned in a sedimentation tank such that the lower water level therein is always above the filter media, causing the buoyant filter media to provide a floating bed through which the incoming waste water enters the sedimentation chamber. The amount of waste water entering the sedimentation chamber depends on the amount of waste water that would normally be consumed in any type of water closet. When the water closet completes its flushing cycle, a valve on the incoming waste water line closes and prevents the backflow of waste water through the system. Simultaneously, a valve connecting the conical filter media chamber is opened to permit gravity flow of the waste water up through the filter media and into a storage chamber for reuse in the water closet through a treatment metering device for decontamination and coloring.

The filter media is comprised of a plurality of spherical elements having a specific gravity of between 0.90 and 0.95 that of water. Since the entire filter media chamber is below the static water level at all times, the filter media elements form a tightly-nested, semi-permeable barrier to entrap particulate matter. The random manner in which the media elements nest together will only allow particulate matter of approximately 15% of the diameter of the media elements to pass through when the media elements are spherical. When the media elements are irregularly-shaped objects; sharp granules; irregular spheres, and so forth, particulate matter of 5% the average diameter is allowed to pass. Thus, the efficiency of performance of the filter can be regulated by the use of media elements of varying size and shapes. For the application of this present invention, the filter media is comprised of a plurality of spherical elements $\frac{3}{8}$ inches in diameter. Laboratory tests have indicated efficiency levels of over 99% removal of solids during extended uses.

As mentioned earlier, the actual filtration cycle occurs after the water closet waste has passed down through the filter media chamber and deposited heavy settleable solids in the sedimentation chamber. As the filter media chamber is at this time well below the surface of the contained liquid as the effluent valve is opened, the liquid head forces the unfiltered liquid in the sedimentation chamber slowly up through the filter media chamber entrapping the particulate material and allowing the filtered liquid to flow into the outer storage chamber from which it is returned to the toilet flush tank.

The important factors accounting for the high solids removal in excess of 99% are: (1) primary sedimentation of heavy large solids; (2) slow depth filtration through the filter media utilizing relatively coarse media; and (3) the additional precoating of the media elements by forcing incoming waste down through the media chamber and uniformly distributing the incoming particles bearing waste within the chamber.

Figure 2:
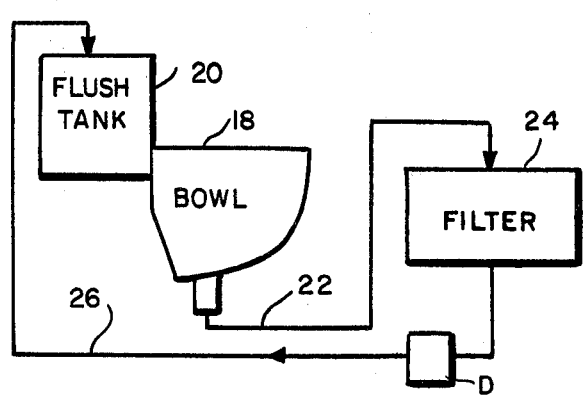
Figure 3:
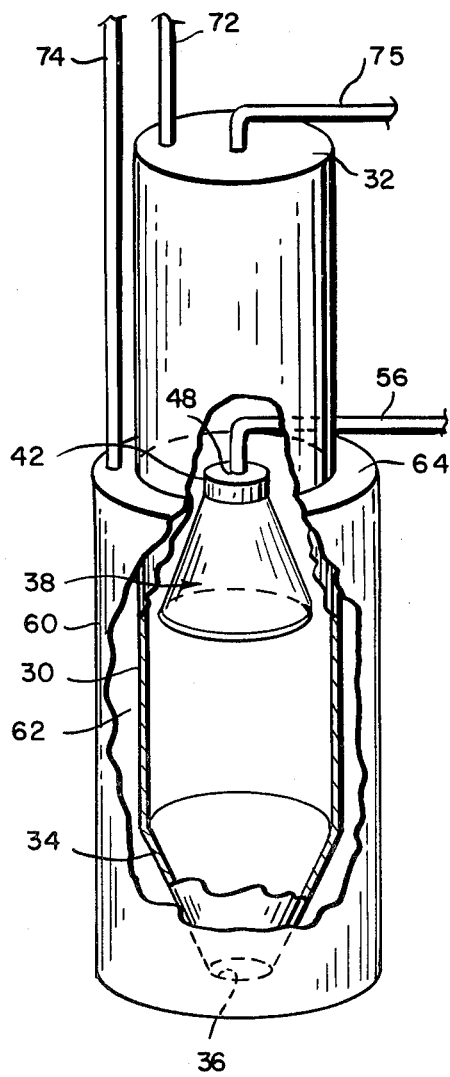
FIG. 3 is a perspective view of a filter unit in elevation broken away in part to show the interior construction.

Referring to the drawings, the filter system of this invention is designed generally for filtering solids from fluids either for the purpose of merely removing the solids from the fluids so that the two can be used separately for whatever purpose is desired, or for the purpose of removing undesirable solids so that the solids can be discarded and the fluid used over again. FIG. 1 illustrates diagrammatically a source 10 of a contaminated fluid, for example, a fluid containing contaminating solids, a filter module 12, and conductors 14 and 16 for, respectively, conducting the contaminating fluid to the filter media and for returning the fluid free of solids to the source. FIG. 2 shows a closed circuit toilet system comprising a bowl 18 and flush tank 20, a conductor 22 for conducting the content of the flushed bowl to a filter module 24 and a conductor 26 for returning the flush water free of effluent to the flush tank 20. Obviously, any fluid from which solids are to be removed could be passed through the filter module and the solids and fluid free of solids disposed of separately.

Figure 9:
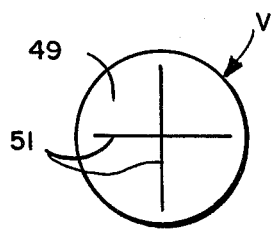
FIG. 9 is a plan view of a one-way valve used for admitting fluid into the module.

The filter module 12 or 24, as shown in FIGS. 1 and 2, is specifically illustrated in FIGS. 3, 4, 5 and 6 and comprises in its preferred form a first cylindrical chamber 30 (sedimentation chamber) having a closure 32 at its upper end and having a concical lower end 34 containing an opening 36. Within the chamber 30, approximately midway between the top and bottom, there is a conical shroud 38 which defines a conical filter media chamber 40, FIGS. 5 and 6, the lower end of which is open. The upper end of the conical shroud is fixed to a manifold 42. The manifold 43 defines a head space 46 at the upper end of the shroud which contains a central opening 48 and a lateral opening 50. A conductor 52 is fixed in the opening 48 with an end extending into the head space where it is connected by way of a valve member V2 to the shroud to provide for delivery of fluid to be treated into the shroud. The conductor 52 is provided with a lateral extension 56, FIG. 4, which extends through a side of the chamber 30 through a suitable watertight gasket 58. The valve V is in the form of a flexible diaphragm 49, FIG. 9, containing diametrally-crossing slits 51 which open in a direction to permit flow into the shroud and which closes to prevent flow in the reverse direction.

A second cylindrical chamber 60 (storage chamber) of larger inside diameter than the outside diameter of the chamber 30 and of shorter axial length is positioned about the lower end of the chamber 30 and provides, in conjunction therewith, an annular storage space 62. The chamber 60 has an annular closure 64 at the top which is sealed about the chamber 30 and an opening 65 at the bottom for receiving the lower conical end 34 of the chamber 30. A closure 66 normally closes the opening 36 at the lower end of the chamber 30.

A conductor 68 is connected at one end to the opening 50 in the manifold and at its other end by way of an opening 51 in the side of the chamber 30 to the chamber 60.

There is a conductor 70 at the lower end of the chamber 60 and vent pipes 72 and 74 at the upper ends of the chambers 30 and 60. Additionally, there is provided at the top of the chamber 30 a pipe 75 for flushing the chamber in the event this is found to be desirable.

There are shut-off valves V1, V2 and V3 in the pipes 56, 58 and 70.

Figure 4:
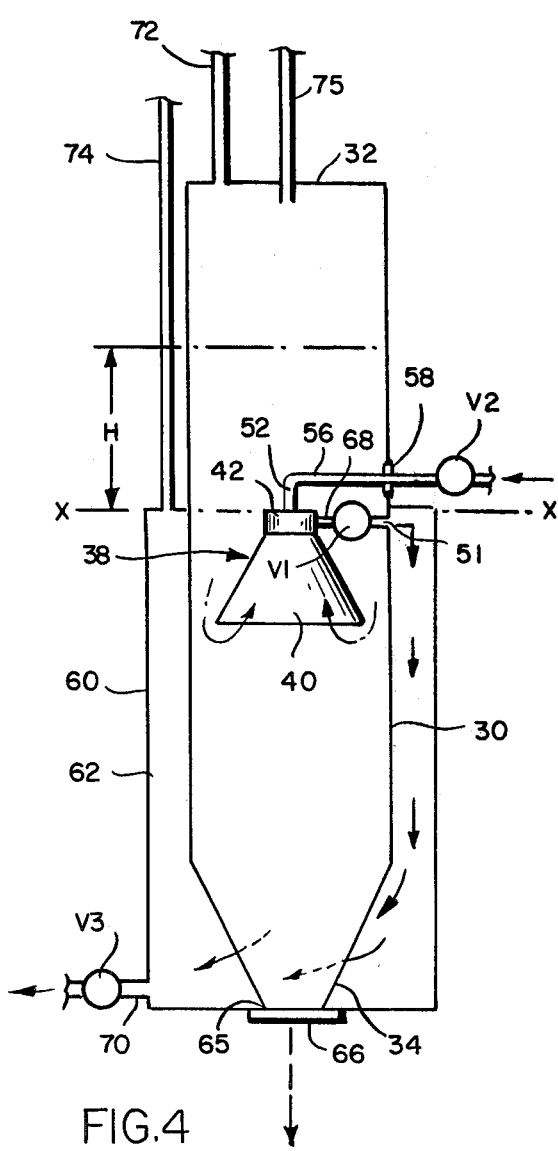
FIG. 4 is a diametral section of FIG. 3.
Figure 5:
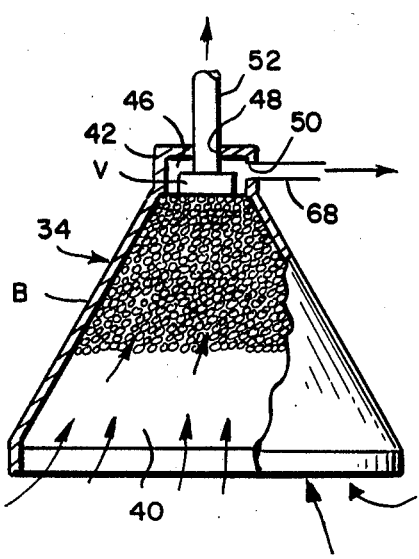
FIG. 5 is a vertical diametral section of the shroud within which the bed of particulate bodies is supported by flotation.
Figure 7:
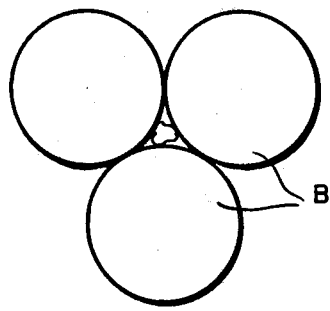
FIG. 7 is an enlarged view of spherical, buoyant bodies used in the filter bed showing the size of the passages between the bodies when they are densely packed.
Figure 8:
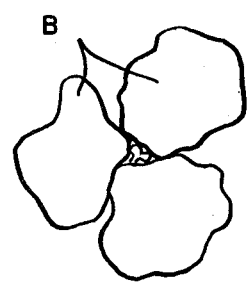
FIG. 8 is a corresponding view of irregular bodies showing the relative size of the passages between the bodies when they are densely packed.

The structure as thus described is provided with a quantity of discrete, buoyant bodies such as shown in FIGS. 7 and 8 of either spherical configuration or of an irregular configuration and these are supported by flotation within the conical shroud, as shown in FIG. 5, in the form of a densely-packed filter media by the presence of the fluid to be filtered in the chamber 30 which stands at a level therein when the filter is between filtering operations approximately at the line X—X, FIG. 4, assuming that the valves V1, V2 and V3 are all closed. In this stage, the buoyant bodies B, FIG. 5, are held tightly packed in the upper region of the conical chamber 34 providing a filter bed of considerable thickness which affords passages through it if the bodies are of spherical configuration of about 0.056 inches and, if of non-spherical configuration, of about 0.019 inches. The valve structure V within the head space of the manifold is of sufficient diameter so that the annular space between the exterior of the valve C and the interior of the manifold will not permit passage of the bodies B. FIGS. 7 and 8, represent, respectively, spherical and irregular filter bodies which, when compacted, provide the aforesaid passages.

Figure 6:
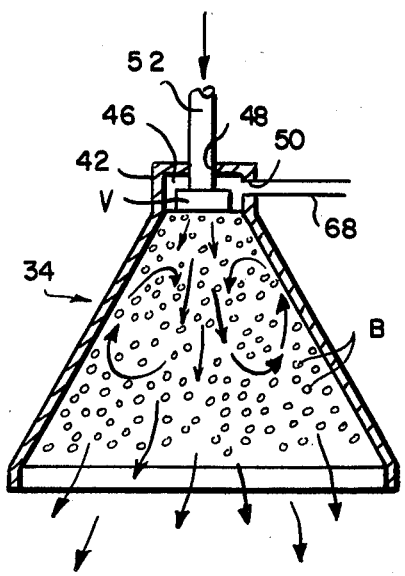
FIG. 6 shows the condition of the particulate bodies of the bed within the shroud during the time that fluid is being injected into the filter.

In operation, the valves V2 and V3 are opened, the valve V1 closed, and the fluid to be filtered is pumped through the conductors 56,52 and valve V into the upper end of the conical chamber 40 at its center so that it effects a downwardly-dispersement of the bodies B at the center which sets up and outward and upward circulation in vertical radial planes with respect to the center of the cone, as shown by the arrows in FIG. 6, causing jostling and rubbing of the bodies B against each other so that any solids which have been deposited on the bodies are rubbed free and allowed to gravitationally descend from the open lower end of the conical chamber into the conical lower end of the chamber 30. Delivery of the fluid to be filtered into the conical chamber 40 is at a pressure which is sufficient to disperse and agitate the bodies, but not so great as to displace the bodies downwardly beyond the lower end of the conical chamber and into the cylindrical chamber therebelow. During the time that the fluid is being discharged into the conical chamber, the valve V1 is closed and the valve V3 is open so that fluid which has been previously filtered can be withdrawn from the chamber 60. As a consequence, a head H of fluid is developed in the chamber 30 above the level X—X of the fluid in the chamber 60. When the valve V2 is closed to terminate delivery of fluid to be treated to the conical chamber, the buoyancy of the fluid in the chamber 30 will restor the bodies B to their densely-packed position, FIG. 5, against the upper end of the conical chamber and as soon as this condition is established, the valve V1 is opened and the head of fluid in the chamber 30 will force the fluid in the chamber 30 upwardly through the densely-packed bed and through the conductor 68 into the chamber 60. When the head in the chamber 30 reaches the level X—X in the chamber 60, flow of fluid from the chamber 30 to the chamber 60 stops.

In a closed circuit filtering operation, fluid is delivered through the conductors 56,52 into the conical chamber with the valve V1 closed and with the valve V3 open so that the previously filtered fluid is being returned for reuse and when the actual filtering operation is taking place, the valve V2 is closed, the valve V1 is opened and the valve V3 is closed.

The filter module described is, as pointed out above, designed to remove solids, extraneous and/or foreign matter from fluids from whatever source on an intermittent basis and has special application to toilet systems which are inherently intermittent in their operation and when the module is used in conjunction with toilet systems which operate in a closed circuit to repeatedly used the same water, it is necessary at times to remove the solids which collect at the bottom of the chamber 30 by opening the closure 66 and to replenish the system by adding fresh water and, further, it is desirable to add both deodorants and coloring matter to the system and this is accomplished by interposing a flowthrough dispenser D with meterin means in the conductor 26 extending from the filter back to the flush tank.

The filter as thus constructed has a high capacity filtering performance due to the fact that it is constantly renewed as each new charge of filter fluid is discharged into the conical chamber, the effect of which is to scrub the solids accumulated on the filter bodies so that they gravitationally drop to the bottom of the container 30 and the further fact that if there is any in-depth accumulation of solids within the bed in its closely-packed position, the solids themselves contribute to the filtering operation in that they preclude the passage of even the smallest particles of contaminant.

Tests have been conducted which indicate that a filter constructed as described above consistently removes as much as 97.5% to 99.84% of the solids.

It should be understood that the present disclosure is for the purpose of illustration only and includes all modifications or improvements which fall within the scope of the appended claims.

What is claimed is:

1. A filter system comprising means defining a first chamber containing fluid up to a predetermined level, a shroud positioned in the chamber immersed in the fluid, said shroud defining a downwardly-open second chamber, a quantity of discrete, buoyant bodies supported in the shroud by flotation, said discrete, buoyant bodies defining a filter medium, a conductor connected to the top of the shroud for delivering fluid to the shroud at a pressure to disperse the discrete bodies downwardly therein as the fluid is forced downwardly into the shroud and into the lower part of the first chamber below the shroud, means surrounding the first chamber defining in conjunction therewith an annular third chamber, a conductor connecting the top of the shroud with said third chamber, a conductor connected to the bottom of the third chamber providing an outlet from the bottom and valves in the several conductors operable on the one hand to admit fluid into the shroud and to prevent fluid to be withdrawn from the third chamber while blocking flow of fluid from the shroud to the third chamber and on the other hand to terminate flow of fluid into the shroud and prevent flow from the third chamber while permitting flow from the shroud into the third chamber.

2. A system according to claim 1 wherein the first chamber has a normally-closed solids discharge opening at the bottom thereof.

3. A filter system comprising a cylindrical chamber containing fluid up to a predetermined level, a conical shroud positioned in the cylindrical chamber, said conical shroud defining a downwardly-open conical chamber, a quantity of discrete, buoyant bodies supported in the conical chamber by flotation, said discrete, buoyant bodies defining a filter media, a conductor connected to the top of the shroud for delivering fluid into the conical chamber at a pressure to disperse the discrete, buoyant bodies downwardly therein as the fluid is forced downwardly through the conical chamber into the lower part of the cylindrical chamber below the conical chamber, means surrounding the cylindrical chamber defining, in conjunction therewith, a filtrate chamber, a conductor connecting the top of the shroud with the filtrate chamber, a conductor connected to the bottom of the filtrate chamber providing an outlet from the bottom thereof and valves in the several conductors operating on the one hand to admit fluid into the conical chamber and to permit fluid to be withdrawn from the filtrate chamber while blocking flow of fluid from the conical chamber to the filtrate chamber and on the other hand to terminate the flow of fluid to the conical chamber and flow from the filtrate chamber while permitting flow from the conical chamber into the filtrate chamber.

4. A filter system according to claim 3 wherein the lower end of the cylindrical chamber contains a normally-closed solids discharge opening.

5. A filter system according to claim 3 wherein the lower end of the cylindrical chamber is conical and contains a normally-closed solids discharge opening.

6. A filter system according to claim 1 wherein there are vent pipes connected to the cylindrical and filtrate chambers.

7. A system according to claim 3 wherein there are vent pipes connected to the cylindrical chamber and to the filtrate chamber.

8. A system according to claim 1 comprising means for delivering fluid to the shroud through the conductor connected thereto at a predetermined pressure and means for drawing off the filtrate from the third chamber through the conductor connected thereto.

9. A system according to claim 3 comprising means for delivering fluid to be filtered to the conical chamber through the conduit connected to the shroud and at a predetermined pressure and means for drawing off the filtrate from the filtrate chamber through the conductor connected thereto.

10. In a system for filtering extraneous matter from a fluid wherein the fluid is delivered into a filter for filtering and returned from the filter for reuse, a filter comprising a first chamber for holding a predetermined volume of fluid, a second chamber positioned in the first chamber immersed in the fluid, said second chamber being downwardly-open, a plurality of buoyant bodies supported within said second chamber by flotation, a third chamber surrounding the first chamber, a conductor connected to the top of the second chamber through which fluid to be filtered is delivered into said second chamber, a conductor connecting the top of the second chamber to the third chamber through which filtrate is delivered into the third chamber, a conductor connected to the third chamber through which filtrate is delivered into the third chamber, a conductor connected to the third chamber through which filtrate is discharged for reuse and valves in the conductors operable on the one hand to admit fluid into the second chamber and to permit fluid to be withdrawn from the third chamber while blocking flow of fluid from the first chamber to the third chamber and on the other hand to terminate flow of fluid into the second chamber and flow from the third chamber while permitting flow of fluid from the second chamber into the third chamber.

11. In a system for filtering solids from a fluid wherein fluid is flushed from a toilet into a filter for filtering and the filtrate returned to the toilet for reuse, a filter comprising a first chamber for holding a predetermined volume of fluid flushed from the toilet, a second chamber positioned in the first chamber immersed in the fluid in said second chamber, said second chamber being downwardly-open, a plurality of discrete, buoyant bodies supported in the second chambe by flotation, a third chamber surrounding the first chamber, a conductor connected to the top of the second chamber through which the fluid to be filtered is delivered into the second chamber, a conductor connecting the top of the second chamber to the third chamber through which filtrate is delivered into the third chamber and a conductor connected to the third chamber through which filtrate is discharged to the toilet flush tank for reuse and valves in the conductors operable on the one hand to admit fluid from the toilet into the second chamber and to permit fluid to be withdrawn from the third chamber for return to the toilet flush tank while blocking flow of fluid from the second chamber to the third chamber and on the other hand to terminate flow of fluid from the toilet to the second chamber and flow from the third chamber to the toilet flush tank while permitting flow from the second chamber into the third chamber.

12. A system according to claim 1 wherein there is a flow control valve at the top of the shroud to which the conductor is connected.

13. A filter system according to claim 3 wherein there is a flow control valve at the top of the shroud to which the conductor is connected.

14. A system according to claim 1 wherein the discrete, buoyant bodies are spherical and of such size that, when randomly packed, they define openings through the pack in the order of 0.056 inches.

15. A system according to claim 3 wherein the discrete, buoyant bodies are spherical and of such size that, when randomly packed, they define openings through the pack in the order of 0.056 inches.

16. A system according to claim 1 wherein the discrete, buoyant bodies are of irregular shape and of such size that, when randomly packed, they define openings through the pack in the order of 0.019 inches.

17. A system according to claim 3 wherein the discrete, buoyant bodies are of irregular shape and of such size that, when randomly packed, they define openings through the pack in the order of 0.019 inches.

18. A method of filtering comprising delivering a predetermined volume of fluid to be filtered downwardly into a downwardly-divergent conical bed of buoyant filter bodies of predetermined thickness constrained at the top and sides, at a pressure to displace the particles at the center of the bed downwardly and to set up circulation of particles from the center outwardly and upwardly in vertical planes radiating from the center, terminating delivery of fluid into the bed when said predetermined volume is reached, allowing the particles to become quiescent and densely-packed and then withdrawing the fluid through the densely-packed bodies.

19. The method of filtering fluid containing solids comprising discharging the fluid into a first chamber through a bed of buoyant bodies held densely-packed therein by flotation against a down-wardly open conical member defining a conical chamber within the first chamber at a pressure to disperse the particles downwardly in the conical chamber to cause any non-buoyant solids adhering to the bodies to be rubbed off and permitted to gravitate to the bottom of the first chamber, terminating delivery of the fluid into the bed and allowing the bodies of the bed to be restored to their undispersed, densely-packed condition and drawing off the fluid in the first chamber through the restored bed into a second chamber in communication with the first chamber.

20. A method according to claim 19 comprising drawing the fluid from the first chamber through the bed into said second chamber to fill the second chamber to substantially the same level as the first chamber.

21. A method according to claim 19 comprising blocking the flow of fluid from the first chamber into the second chamber while fluid is being delivered into the first chamber and fluid is being withdrawn from the second chamber to provide a head of fluid in the first chamber above that in the second chamber, blocking flow of fluid into the first chamber and flow from the second chamber and establishing flow from the first chamber to the second chamber such that the head of fluid in the first chamber will discharge the fluid from the first chamber through the bed into the second chamber.

22. A filter module comprising a first chamber having vertically-aligned top and bottom openings and a lateral opening at the bottom, a second chamber of greater vertical height but of lesser cross section positioned in the first chamber with its lower end coinciding with the bottom opening and its upper end extending through the top opening, said second chamber having a bottom opening and a closed top, a third chamber closed at the top and open at the bottom positioned within the second chamber at a level below the top of the first chamber, a conductor extending through a side of the second chamber and connected interiorly of said second chamber to the top of the third chamber, a conductor connected to the top of the third chamber and extending through a side of said third chamber into the first chamber, and a normally-closed valve member closing the bottom opening of the second chamber.

23. A filter module according to claim 22 wherein the first and second chambers are of circular cross section, the second chamber being of such smaller diameter as to provide an annular space between the first and second chambers and said second chamber having a conical lower portion, the lower end of which is open and corresponds in diameter to the opening at the bottom of the first chamber.

24. A filter according to claim 23 wherein the third chamber is a downwardly-open frustoconical cone, the upper end of which is at substantially the same level as the top of the first chamber.

* * * * *